April 27, 1965

YOSHIRO MURATA 3,180,453

VALVE DEVICE OF AN OIL DAMPER FOR SUSPENSION
OF A WHEEL OF A VEHICLE

Filed Aug. 22, 1963

INVENTOR
YOSHIRO MURATA
BY
Mason, Fenwick & Lawrence
Attorneys

United States Patent Office

3,180,453
Patented Apr. 27, 1965

3,180,453
VALVE DEVICE OF AN OIL DAMPER FOR SUSPENSION OF A WHEEL OF A VEHICLE
Yoshiro Murata, Tokyo, Japan, assignor to Kayaba Industry Co., Ltd., Minato-ku, Tokyo, Japan, a corporation of Japan
Filed Aug. 22, 1963, Ser. No. 303,831
3 Claims. (Cl. 188—100)

The present invention relates to a valve device of an oil damper for suspension of a wheel of a vehicle.

Generally in the hitherto known oil damper, it has been common to accommodate a damping valve in the passage of the oil that flows from a high pressure side to a low pressure side to operate in response to the oil pressure and to control the expansion and contraction movements of the damper so that an adequate oil pressure resistance may be obtained in the cylinder when the damper makes such expansion and contraction movements. A similar device has been employed also in the conventional oil damper for suspending the wheel of a vehicle. The wheel suspending oil damper solely provided with such mechanical valve device produces a vibration controlling power almost proportional to the expansion or contraction speed of the damper. Assuming that a certain control is made in the expansion speed of a damper corresponding to the frequency of the secondary resonance of a wheel (unsprung weight vibration), and that the damper enters a transitional phase to produce a higher frequency unsprung weight vibration or high speed such as sudden tossing-up movement of a wheel, there appears a higher resistance corresponding to such speed. As a result, an impulsive counter force is given on the car body greatly uncomfortable to the passenger.

Main object of the present invention is to overcome such disadvantages by the provision of an improved piston valve for oil damper on the damper piston or on its base said piston valve operating so as to sense rate of pressure rise of oil in the cylinder, enlarge the passage area communicating a high pressure side to a low pressure side if the said rate is larger than a predetermined value and reduce or closed the passage area if it is smaller whereby the production of disadvantageous damping force is protected in a transitional phase such as a high frequency vibration or sudden tossing-up movement of unsprung weight and improvements of comfortable ride in and durability of a car are obtained without transmitting impulsive reaction when the device is combined with known damping valve device controlling passage area only by pressure quantity. The other objects and advantages of this invention will be apparent from the following description with reference to the drawings showing embodiments.

Figure 1:
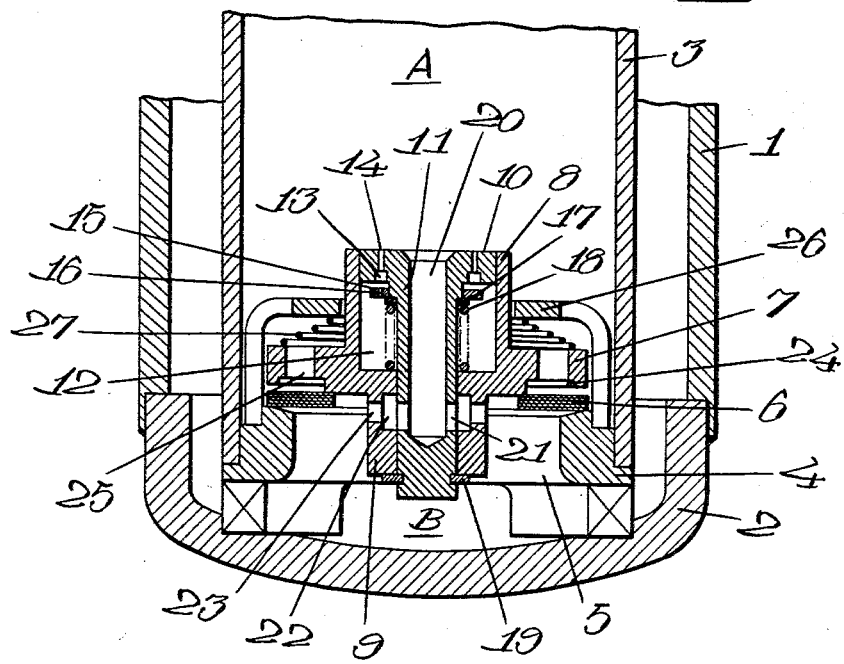
Figure 2:
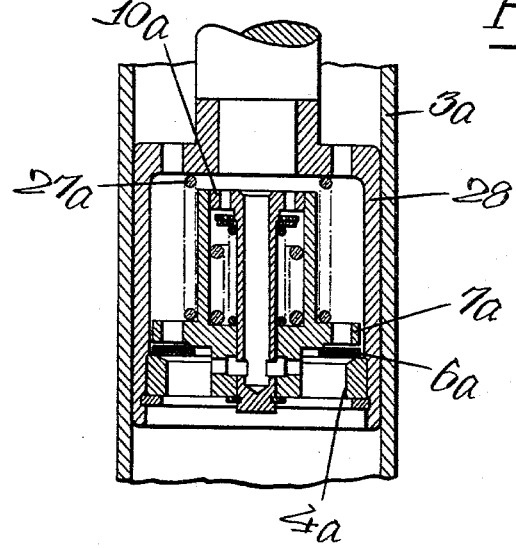

The drawings show embodiments of the invention, in which FIG. 1 and FIG. 2 show a vertical section of a base valve and a piston valve of the oil damper, respectively.

Referring to the embodiment of FIG. 1, 1 is an outer cylinder, 2 a bottom cover fixed oil-tightly at the lower end portion of the outer cylinder 1, 3 an inner cylinder, 4 a base or valve seat serving as a seat for the base valve which is fixed oil-tightly at the lower end and inside of the inner cylinder 3, maintains the relative position between the inner cylinder 3 and the bottom cover 2 and provided with a passage 5 communicating between the inner cylinder 3 and the outer cylinder 1. Ring-shaped disc valve 6 consist of layers of leaf spring, the outer circumference of the lower face of which adjoins the valve seat and the inner circumference of the upper face also adjoins the inner side valve seat of a valve retainer 7. This valve retainer 7 is provided with a cylinder 8 on its upper portion and a boss 9 on its lower portion inside which a piston valve 10 with a hollow valve shaft 11 is inserted oil-tightly and a ring-shaped and closed oil chamber 12 is provided on the side of a valve shaft 11. The piston valve 10 is provided with a ring-shaped chamber 13 and a channel 14 communicating the ring-shaped and closed oil chamber 12 and the upper oil chamber A of the inner cylinder 3, said ring-shaped chamber 13 being provided with an orifice 16 on a valve member 15 to close the said ring-shaped chamber 13, said valve member 15 being aided by a support ring 17 fitted about the valve shaft 11. Between the valve member 15 and the cylinder 8 there is provided a spring 18. A spring 18 serves to retain the piston valve 10 at the uppermost position of the cylinder 8 by a stop ring 19 on the lower end of the valve shaft 11. A hallow passage 20 of the valve shaft 11 has its upper end portion opened to an upper oil chamber A and its lower end portion opened to a lower oil chamber B of the inner cylinder 3 through a transverse channel 21 in the shaft wall and a ring-shaped chamber 22 on the boss 9 and a transverse channel 23 provided on the circumeferential wall of the transverse chamber. Ring-shaped chamber 24 is formed opposite to the disc valve 6 underneath the communicating bore 25 of the valve retainer 7. A guide piece 26 is connected to the base 4. It holds the valve retainer 7 and the disc valve 6 at a central position and connects to the valve retainer 7, the disc valve 6 and the base 4 by a spring 27.

When the oil damper of this construction is compressed by the external force, the outer circumference of the lower portion of the valve retainer 7 is pressed on the outer circumference of the disc valve 6 by the oil pressure produced in the oil chamber A of the inner cylinder 3, and at the same time the valve seat on its lower inside part presses down the inner circumference of the disc valve 6 providing a slight initial deflection to it to be deformed into a funnel form. With the rise of oil pressure, when the pressure of a ring-shaped chamber 24 of the valve retainer 7 exceeds the spring force of the disc valve 6, said disc valve 6 is deflected further with its inner circumference separated from the lower portion of the valve retainer 7 and there is formed a passage for the flow of oil. The passage area varies proportionately with the deflection of the disc valve 6 or the pressure of the oil chamber A thus to bring about a required diminishing force. During the process of expansion of the oil damper, the valve retainer 7 moves upward resisting spring 27 and produces a passage of large area against the base 4, therefore the oil flowing from the lower oil chamber B to the upper oil chamber A is subjected to a very small resistance. The disc valve 6 of this sort has been employed heretofore as in a common damping valve, but in such damping valve device as above, there arises a high resistance against a high frequency vibration of the unsprung weight higher than the secondary resonance of a vehicle and a sudden tossing-up movement due to uneven road giving uncomfortable vibration or a sudden impulse to the car body. This is a common disadvantage in the publicly known valve device which is intended to control the passage area of oil solely by the pressure quantity produced in the cylinder.

In the embodiment of FIG. 1, if the pressure of the oil chamber A in the inner cylinder 3 acts on the piston valve 10, the piston valve 10 is subjected to the difference between upper and lower pressure area, namely, to the pushing down pressure on the effective pressure surface equivalent to the cross sectional area of the valve shaft 11, as a consequence, the pushing down pressure overcomes the reactionary force of the spring 18 and thereby the piston valve 10 comes downward. When the above-mentioned pressure changes dynamically, the piston valve 10 is pushed down at a proportionate speed contrary to the pressure rise. The oil in the closed chamber 12 must be discharged into the upper oil chamber A, in which case the valve member 15 closes the ring-shaped chamber 13 in order to make the piston valve 10 to come down. The greater the falling velocity, the more the flow resistance of oil passing through the orifice 16 would increase. On the other hand, the passage area of the oil communicating through the upper and lower oil chambers A, B of the inner cylinder 3 through the passage 20 and transverse channel 21 of the valve shaft 11 and also the transverse channel 23 of the valve retainer boss 9 will diminish, and later be closed as the transverse channel 21 is closed by the boss 9. In case the pressure rise rate of the oil chamber A and thus forced vibration of the damper exceeds a predetermined value (this is determined by the ratio of opening area of orifice 16 and the transverse section of the closed oil chamber 12), the fall of the piston valve 10 would be small and the opening area of the transverse channel 21 would be large, and therefore the oil in the oil chamber A flows into the oil chamber B not being subjected to a high resistance but controlling the ratio of pressure rise in the oil chamber A. In case the ratio of pressure rise in the oil chamber B does not exceed the predetermined value, the piston valve 10 comes down to the point enough to close the transverse channel 21 and intercepts the communication of the upper and lower oil chambers A and B through the passage 20, thereby the disc valve 6 may carry out the damping operation. When the piston valve 10 rises or restores to the initial position, the valve member 15 opens by the oil coming into the closed chamber 12, separates from the ring-shaped chamber 13 and pushes it into the closed chamber 12 abruptly so that the restoration is effected quickly to be prepared for subsequent oil pressure produced in the oil chamber A.

FIG. 2 represents an embodiment of the present invention applied in a piston valve of an oil damper, wherein on the lower end portion of a piston cylinder 28 slidably inserted into an inner cylinder 3a is fixed a valve seat 4a, to which are also fitted the valve retainer 7a, disc valve 6a, and piston valve 10a through a spring 27a. The structure is almost same as the base valve in FIG. 1, which is featured to operate in the stroke of contraction of the oil damper, whereas the valve shown in FIG. 2 operates in the stroke of expansion of the oil damper.

What is claimed is:
1. A valve assembly for hydraulic shock absorbers to regulate the flow of fluid from a high pressure working space to a low pressure working space in response to pressure upon the fluid, the valve assembly comprising a valve housing having a throughbore, a piston valve, a piston valve shaft integral with the piston valve, the piston valve and valve shaft located for reciprocative movement in the valve housing throughbore, the integral piston valve and piston valve shaft cooperating with the valve housing throughbore to define a fluid containing damping chamber therebetween, means retaining the integral piston valve and piston valve shaft in the valve housing, a normally open orifice located in the piston valve connecting the high pressure working space with the damping chamber, a movable member for varying the flow capacity of the piston valve orifice and being movable responsive to pressure of the fluid within the damping chamber on one side and to pressure of the high pressure working space on the other side, spring means supporting the integral piston valve and valve shaft relative to the valve housing, an elongated cavity traversing the valve shaft along the longitudinal length thereof and terminating short of the free end of the valve shaft that is opposite the piston valve, the cavity extending through the piston valve and communicating with the high pressure working space, orifice means in the side wall of the valve housing communicating with the low pressure working space, transverse orifice means in the valve shaft communicating with the cavity and adapted to register with the valve housing side wall orifice means at predetermined selected times, whereby the spring means and the integral piston valve and valve shaft are adapted to displace relatively to the valve housing at a velocity inversely proportional to the rise rate of fluid pressure produced in the high pressure working space upon the closing of the orifice varying member thus controlling the area of passage of fluid through the cavity in the valve shaft to the low pressure working space.

2. In a valve assembly for hydraulic shock absorbers, the combination recited in claim 1 wherein the spring means supporting the integral piston valve and valve shaft is located solely within the damping chamber and positioned about the valve shaft.

3. In a valve assembly for hydraulic shock absorbers, the combination recited in claim 2 wherein the valve assembly includes a valve seat and a resilient disc valve positioned between the valve seat and the valve housing whereby the valve housing is solely supported by the resilient disc valve.

References Cited by the Examiner
UNITED STATES PATENTS

| 2,031,000 | 2/36 | Mercier | 267—64 |
| 2,240,644 | 5/41 | Focht | 188—88 |
| 2,465,680 | 3/49 | Focht | 188—88 |
| 2,865,396 | 12/58 | Focht | 188—88 |
| 3,072,144 | 1/63 | Cassell | 137—514.5 |
| 3,103,230 | 9/63 | Kutsche | 137—514.5 |

FOREIGN PATENTS 951,693 10/56 Germany.

ARTHUR L. LA POINT, *Primary Examiner.*
EUGENE G. BOTZ, *Examiner.*